United States Patent [19]
Patel et al.

[11] Patent Number: 5,755,842
[45] Date of Patent: May 26, 1998

[54] AIR CLEANER HAVING REMOVABLE END CAP

[75] Inventors: Jhina U. Patel, Willoughby; Robert J. Gielink, Cleveland, both of Ohio

[73] Assignee: Air-Maze Corporation, Stow, Ohio

[21] Appl. No.: 828,729

[22] Filed: Mar. 24, 1997

Related U.S. Application Data

[63] Continuation of Ser. No. 498,418, Jul. 5, 1995, abandoned.

[51] Int. Cl.⁶ .................................................. B01D 46/24
[52] U.S. Cl. .................. 55/330; 55/385.3; 55/498; 55/502; 55/503; 55/510
[58] Field of Search ...................... 95/273; 123/198 E; 55/498, 502, 503, 504, 510, 493, 490, 482, 480, 413, 330, 414, 385.3

[56] References Cited

U.S. PATENT DOCUMENTS

| | | | |
|---|---|---|---|
| 2,675,886 | 4/1954 | McMullen | 55/510 |
| 3,130,025 | 4/1964 | Bowden et al. | 55/503 |
| 3,218,785 | 11/1965 | Tietz | 55/503 |
| 3,672,130 | 6/1972 | Sullivan et al. | 55/504 |
| 4,135,899 | 1/1979 | Gauer | 55/503 |
| 4,148,732 | 4/1979 | Burrows et al. | 55/503 |
| 4,211,543 | 7/1980 | Tokar et al. | 55/503 |
| 4,278,455 | 7/1981 | Nardi | 55/498 |
| 4,312,651 | 1/1982 | Esaki et al. | 55/502 |
| 4,493,717 | 1/1985 | Berger, Jr. et al. | 55/330 |
| 4,950,317 | 8/1990 | Dottermans | 55/498 |
| 5,120,337 | 6/1992 | Benzler et al. | 55/498 |
| 5,171,342 | 12/1992 | Trefz | 55/498 |

FOREIGN PATENT DOCUMENTS

| | | |
|---|---|---|
| 0562502 | 9/1993 | European Pat. Off. . |
| 2520099 | 11/0000 | Germany . |
| 2035832 | 1/1980 | United Kingdom . |

Primary Examiner—Duane Smith
Attorney, Agent, or Firm—Rankin, Hill, Porter & Clark LLP

[57] ABSTRACT

An air cleaner includes a housing having an air inlet and an air outlet. The housing includes a body having an open end and an end cap adapted to close the open end of the body. A filter element is positioned within the housing between the air inlet and the air outlet. A bayonet connection is formed in the body and the end cap for attaching the end cap to the body. The bayonet connection eliminates the need for the clamps or tie rods used in the prior art. The air cleaner also has a positioning guide for maintaining the filter element in a substantially axial position when the end cap is attached.

12 Claims, 5 Drawing Sheets

AIR CLEANER HAVING REMOVABLE END CAP

This application is a continuation of application Ser. No. 08/498,418, filed Jul. 5, 1995, now abandoned.

BACKGROUND OF THE INVENTION

1. Field of the Invention

This invention relates to air cleaners, and more particularly to air cleaners having removable end caps to provide access to removable filter elements.

2. Description of the Prior Art

Air cleaners or air filters are well known in the art and are commonly used to clean intake air for engines and other devices. The air cleaners generally include a cylindrical housing within which one or more cylindrical filter element is provided. In addition to a primary filter element, a secondary filter element or safety filter element may be included inside the primary filter element. An air inlet is connected to the body, and air enters the outside of the filter element where it is drawn through the filter elements to an air outlet connected to the interior of the filter elements. This design is also utilized in two-stage air cleaners in which a cyclonic flow is imparted to the incoming air to separate larger dirt particles from the air flow.

The air cleaner housing usually includes a removable portion so that the filter elements inside can be removed to be cleaned or replaced. Often, the housing includes an end cap on one end of a housing body which is made to be removable for this purpose. Clamps are sometimes provided to removably hold the end cap to the body and to secure the filter elements within the housing. Alternative, a tie rod may be provided to hold the end cap to the body and secure the filter elements. To remove the end cap from the body, the clamps are uncoupled or the tie rod removed, and the end cap is detached. To replace the end cap, the clamps or tie rod must be aligned and the end cap must be properly seated before the clamps can be re-engaged. The engagement and disengagement of the clamps or tie rods requires that there be adequate room around the separator, which may be difficult in some installations. If clamps are used, several clamps must be provided, and the clamps are a fairly expensive part of the air cleaner housing. In addition, the clamps or tie rod can fail, requiring replacement of the air cleaner. Therefore, it would be desirable to provide a mechanism for attaching the end cap to the housing body which did not require the clamps.

Another problem in the design of prior art air cleaners involves the orientation of the filter elements when the end cap is installed. The filter elements should be in substantially an axial orientation so that the end cap can be properly installed and so that the filter elements will make a proper seal with the ends of the housing. However, the filter elements sometimes are askew when the end cap is replaced, making it difficult for the end cap to fit and making it possible for leaking to occur around the ends of the filter elements.

SUMMARY OF THE INVENTION

The present invention overcomes the problems of the prior art and provides other advantages that have not been realized heretofore. The present invention provides an air cleaner in which the removable end cap is attached to the body of the air cleaner without the use of clamps or tie rods. A unique bayonet attachment is provided to connect the end cap to the body, making the end cap easier to attach to the body and eliminating the clamps or tie rods commonly used by the prior art.

The bayonet attachment of the present invention is much easier to use than the prior art mechanisms which were employed to attach the end cap to the body, since the end cap is installed by simply positioning the end cap and turning it relative to the body to secure the end cap in place. There is no need to operate cumbersome clamps or tie rods on the sides of the housing, so access to the sides of the separator housing need not be provided. The bayonet attachment thus allows for a smaller operating envelope when servicing elements than was needed with prior art clamps and tie rods.

The bayonet attachment of the present invention provides a less expensive means for attaching the end cap to the body. The bayonet coupling eliminates the expense of separate clamps. The bayonet attachment can be formed into the housing body and the end cap when they are molded or otherwise manufactured without significant additional expense. The bayonet attachment requires only that tabs be formed on one member and that corresponding circumferential slots be formed on the other member. The tabs can then be inserted into the slots, and the end member rotated with respect to the body to move the tabs through the slots and attach the end cap to the body.

By providing a bayonet connection instead of the clamps or tie rods of the prior art, the reliability of the attachment mechanism is improved. The bayonet connection should be less likely to wear out or fail, increasing the useful life of the air cleaner. Since the bayonet connection is formed internal in the housing which is usually made of plastic, it will not rust or corrode as would the metallic members of external clamps or tie rods.

The air cleaner of the present invention also includes a positioning guide which provides additional support to the filter elements within the housing and assures that the filter elements will be held in proper axial orientation when the end cap is attached. This positioning guide makes the end cap easier to install since the filter elements are held axially, and it helps assure that the seals at the end of the filter elements will be in place to prevent dirt-laden air from bypassing the filter elements. The positioning guide preferably includes a plurality of fins formed in a cross-like configuration when viewed from the end of the air cleaner and which have bullet-nose profile to allow for easy placement of the inner safety filter element.

These and other advantages are provided by the present invention of an air cleaner which comprises a housing having an air inlet and an air outlet. The housing comprises a body having an open end and an end cap adapted to close the open end of the body. A filter element is positioned within the housing between the air inlet and the air outlet. A bayonet connection is formed in the body and the end cap for attaching the end cap to the body.

DETAILED DESCRIPTION OF THE PREFERRED EMBODIMENT

Figure 1:
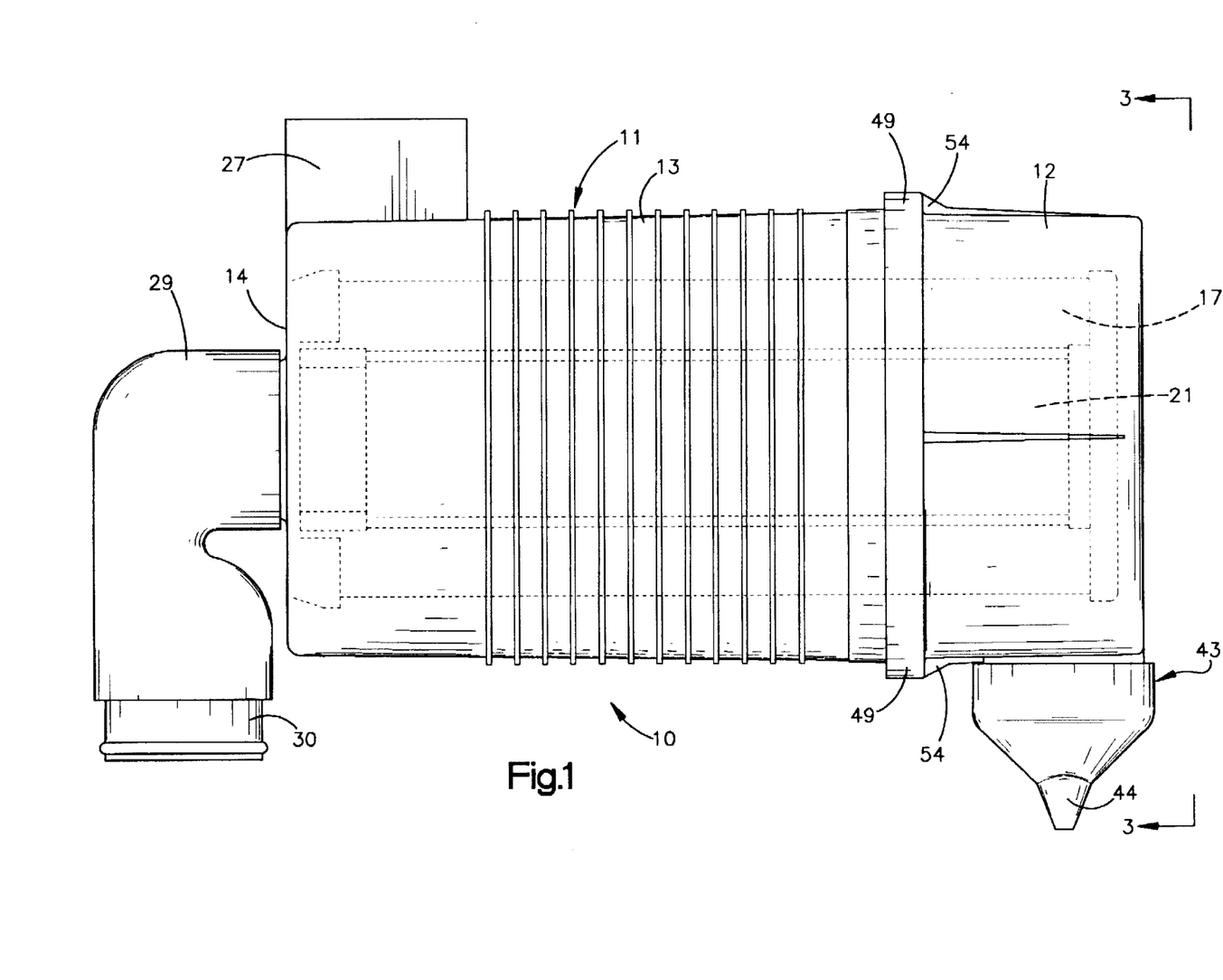
FIG. 1 is a side elevational view of the air cleaner of the present invention.

Referring more particularly to the drawings and initially to FIG. 1, there is shown a two-stage air cleaner 10 according to the present invention. The air cleaner 10 includes an outer housing formed of a body 11 and an end cap 12. The body 11 comprises a generally cylindrical outer side portion 13 and an end portion 14 closing one end of the cylindrical side portion. The generally cylindrical side portion 13 of the body 11 defines a central axis of the air cleaner 10. A bowl shaped end cap 12 is removably attached to the other open end of the body 11. The body 11 and the end cap 12 can be made of any suitable material, with the preferred material being a polypropylene material.

Figure 2:
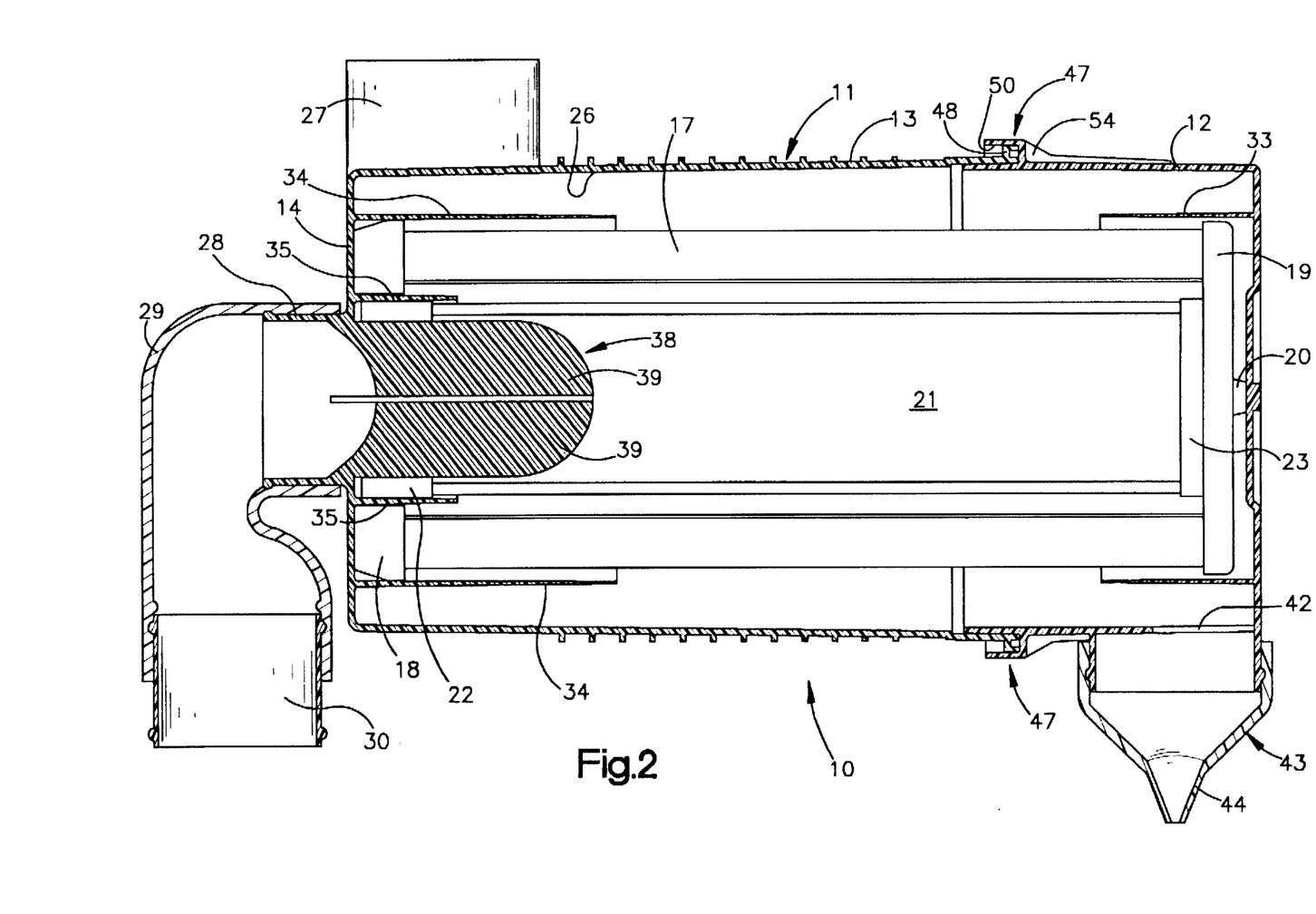
FIG. 2 is a side sectional view of the air cleaner of FIG. 1.
Figure 6:
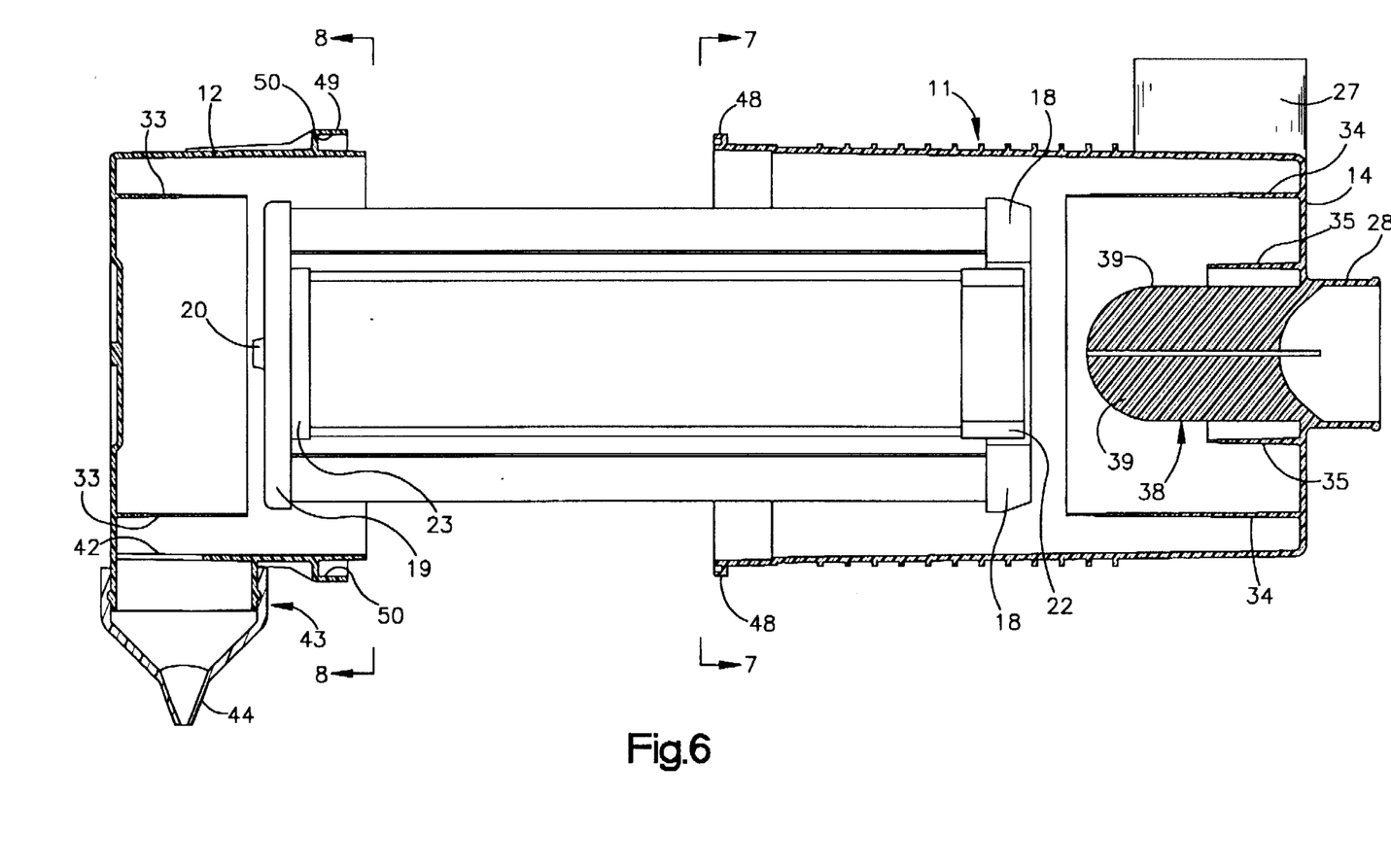
FIG. 6 is a side sectional view of the air cleaner similar to FIG. 2 with parts of the air cleaner disassembled.

Mounted within the body 11 is a replaceable filter element 17, as shown in FIGS. 2 and 6. The filter element is of the type well known in the art, and is generally cylindrical with soft, flexible, resilient sealing members 18 and 19 on each end. One sealing end member 18 is in the shape of an annular ring which is open in the middle, and the other sealing end member 19 is in the shape of a disc which is closed in the middle. A raised protrusion or button 20 is formed on the middle of the sealing end cap 19 at one end. Mounted within the primary filter element 17 is a safety filter element 21. The safety filter element 21, which may be of any type known in the art, is mounted coaxially within the primary filter element 17 and provides additional or "back-up" filtering capability in the event that any particles are not removed by the primary filter element 17. The safety filter element 21 is also generally cylindrical with soft, flexible, resilient sealing members 22 and 23 on each end.

Figure 7:
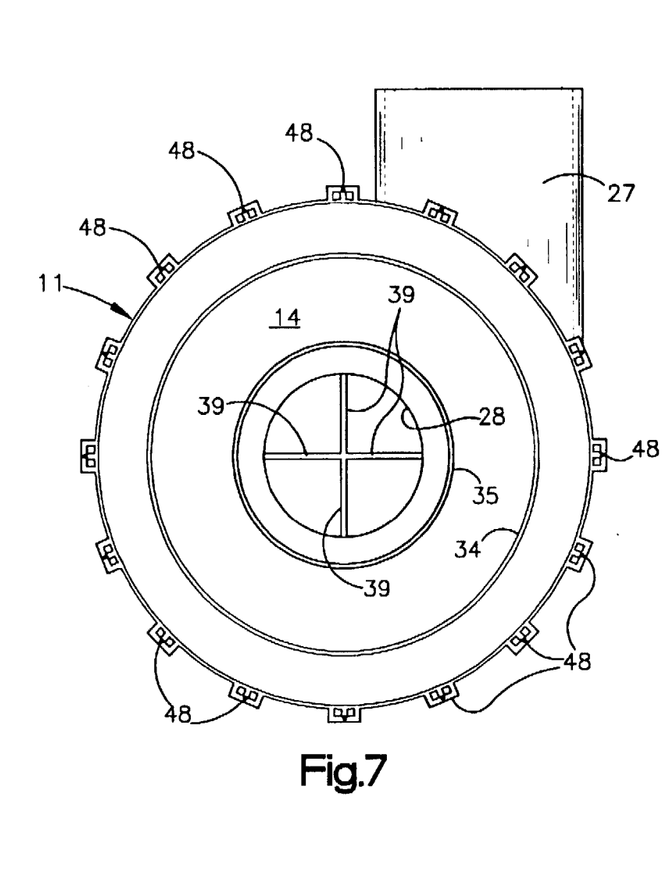
FIG. 7 is an end sectional view taken along line 7—7 of FIG. 6.

Referring to FIG. 2, a separation chamber 26 is formed around the outside the primary filter element 17, between the primary filter element and interior surface of the cylindrical side portion 13 of the body 11. Air enters the cleaner 10 through an air inlet 27 (FIGS. 2 and 7) which is formed in the side portion 13 of the body 12 near the end portion 14 and which extends tangentially from the axis of the air cleaner. The orientation of the air inlet 27 imparts a swirl to the air as it enters the separation chamber 26, and this swirl creates a cyclone effect in which centrifugal force causes heavier dirt particles entrained in the air to be forced to the interior wall of the side portion 13, where they travel along the wall to the end cap 12. The air then travels through the primary filter element 17 and through the safety filter element 21 into interior of the safety filter element where it enters an air outlet 28. The air exits the air cleaner 10 through the air outlet 28 which is formed in the end portion 14 of the body 11 and which extends axially from the end portion. An outlet elbow 29 may be connected to the outlet 28, if desired. The end of the outlet elbow 29 may have a connection 30 which can be connected to a conventional hose leading to the air supply of an engine or other device for which clean air is supplied.

As shown in FIGS. 2 and 6, the end cap 12 includes a cylindrical shroud 33 which extends along the exterior of the primary filter element 17 and which holds the primary filter element in place. The end portion 14 of the body also includes a complementary cylindrical shroud 34 which also extends along the exterior of the other end of the primary filter element 17 and which holds the primary filter element in place. Another smaller cylindrical shroud 35 is located radially inside the shroud 34 and extends along the interior of the primary filter element 17 to hold it in place. The end ring 18 of the primary filer element 17 thus fits between the shrouds 34 and 35 and the end ring provides a seal between the primary filter element and the end portion 14 of the body 11.

To provide proper positioning of the safety filter element 21, a positioning guide 38 is provided in the end portion 14 of the body 11 at the air outlet 28. The positioning guide 38 preferably includes four fins 39 which extend from the end portion 14 at the air outlet 28. The fins 39 extend perpendicularly with respect to each other in radial planes, forming a cross when viewed from the end of the air cleaner (FIG. 7), and allowing for the free flow of air from the safety filter element and through the air outlet 28. The extended ends of the fins 39 preferably have a bullet-nose profile (FIGS. 2 and 6) to facilitate the placement of the safety filter element over the fins. The fins 39 extend for a substantial distance within the interior of the safety filter element and assure that the filter element maintains a substantially axial orientation within the body of the air cleaner before the end cap 12 is attached. Since the primary filter element 17 fits tightly over the safety filter element 21, the maintenance of proper axial orientation of the safety filter element assures that the primary filter element will also be maintained in a substantially axial orientation within the body of the air cleaner when the end cap 12 is attached.

Figure 3:
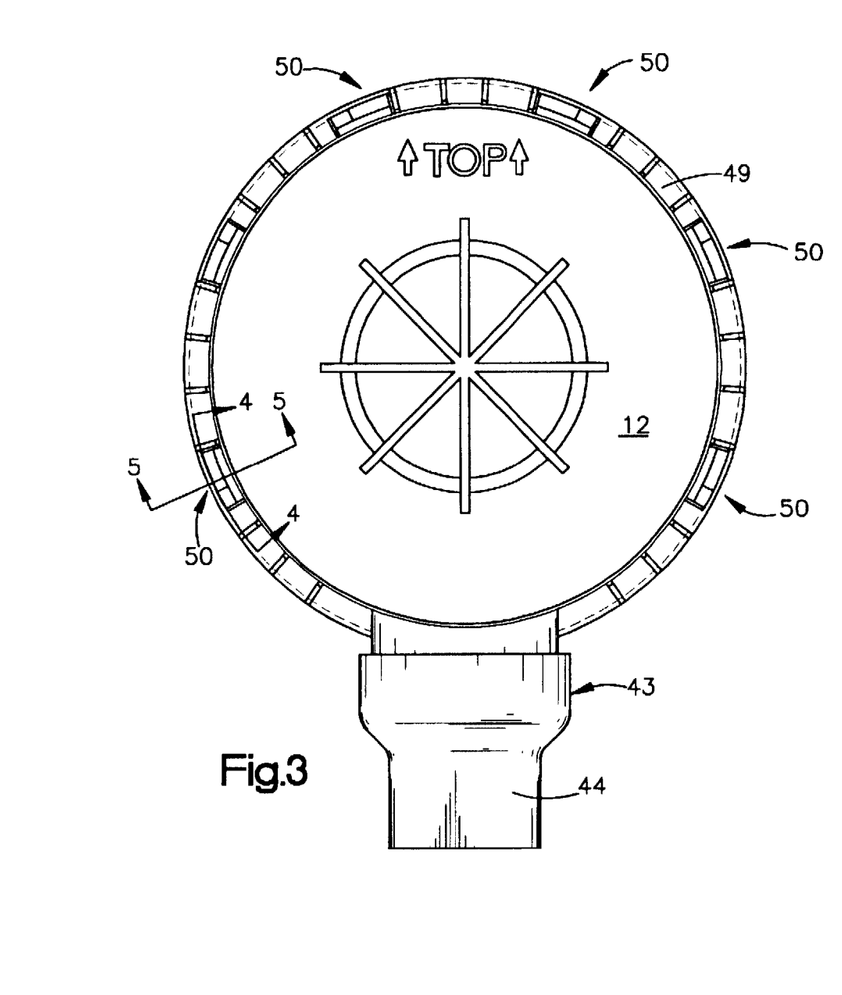
FIG. 3 is an end elevational view of the air cleaner taken along line 3—3 of FIG. 1.
Figure 4:
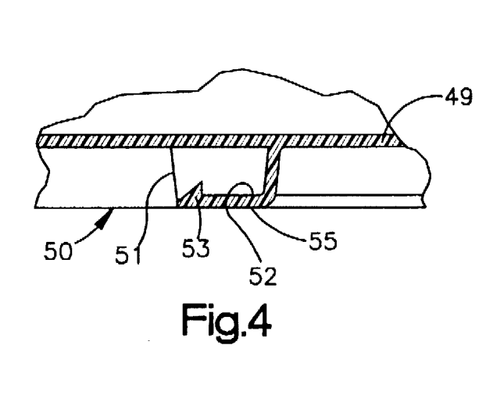
FIG. 4 is a detailed sectional view taken along line 4—4 of FIG. 3.

The dirt particles which have been separated from the air flow by the cyclone action in the separation chamber 26 accumulate in the end cap 12 where they drop through an opening 42 in the end cap 12 so that they can be periodically removed through an unloader valve 43. The unloader valve 43, which is attached to a vertically extending tube in the end cap 12, includes an elongated flexible rubber nipple having lips 44 which can be separated to allow dirt particles to escape. The lips 44 open when dirt accumulates in the unloader valve 43, and this allows the dirt to be dumped from the end cap 12. The lips 44 are otherwise closed together by the reduction of pressure within the air cleaner resulting from the moving air in the air cleaner. As shown in the drawings, the end cap 12 is preferably positioned so that the unloader valve 43 is pointed downwardly, in order to allow the dirt to accumulate in the valve. The end cap 12 may be provided with suitable indicia (FIG. 3) to assist the user in positioning the end cap so that the unloader valve is pointed downwardly.

Figure 5:
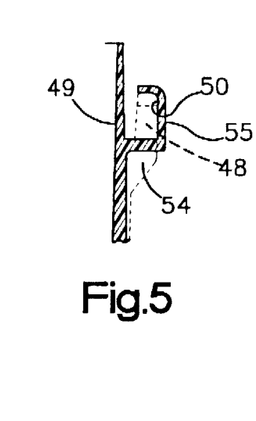
FIG. 5 is a detailed sectional view taken along line 5—5 of FIG. 3.
Figure 8:
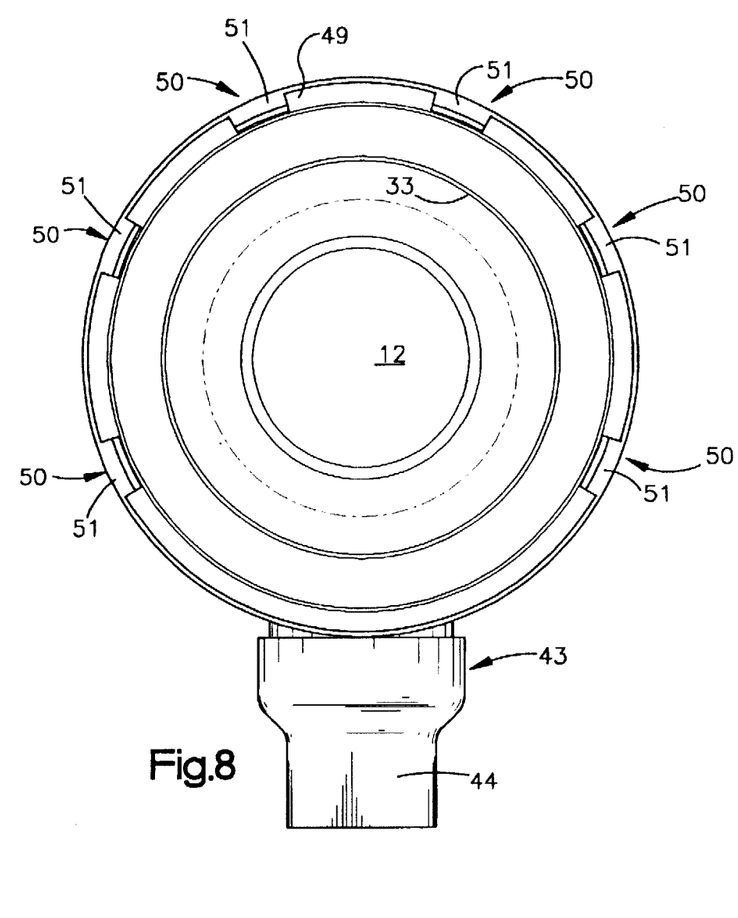
FIG. 8 is an end sectional view taken along line 8—8 of FIG. 6.

Access must be provided to the primary filter element 17 and as well as the safety filter element 21 in order to remove or clean the filter elements, so the end cap 12 is made to be removable (see FIG. 6). The air cleaner of the present invention uses a unique bayonet coupling 47 to removably connect the end cap 12 to the body 11. The bayonet coupling 47 includes a plurality of tabs 48 (FIG. 7) extending outwardly around the exterior of the body where the body is connected to the end cap 12. Preferably in the air cleaner shown, 16 tabs 48 are provided, each approximately 22.5° apart on center. The end of the end cap 12 is provided with a radially extending rim 49, and the tabs 48 engage the rim when the end cap abuts the body. A plurality of slots 50 (FIG. 8) are formed in the rim 49 and are capable of being engaged by some of the tabs 48. As shown in FIG. 8, six slots 50 are preferably provided. Each of the slots 50 extends circumferentially and is formed by a slot member 55 which extends from the rim 49 with the slot being formed between the slot member and the rim. At one end of each slot is a slot opening 51 into which one of tabs 48 can enter the slot as the end cap 12 is rotated relative to the body 11. At the other end of each slot is a locking position or locking groove 52. A hook 53 (FIGS. 5 and 6) is provided on the slot member 55 to separate the locking groove from the remainder of the slot and to retain one of tabs 48 within the locking groove. A plurality of gussets 54 are formed in the end cap 12 to help support the rim 49 and to prevent the rim from bending back when the end cap is pushed onto the body 11.

In addition to sealing the filter elements 17 and 21 to the ends of the housing and preventing the flow of air around the filter elements inside the air cleaner, the soft, flexible, resilient sealing elements 18, 19, 22 and 23 also provide a spring force which urges the end cap 12 away from the body 11. The button 20 formed on the end cap 19 of the primary filter element 17 assists in providing this spring force. The button 20, which is small, soft, flexible and resilient, can be easily compressed when the end cap 12 is attached. These elements thus function as spring members which supply a force to maintain the tabs 48 in the locking grooves in the slots 50 and holds the end cap 12 securely to the body 11. The end cap 12, however, can be easily removed by pushing the end cap 12 toward the body to overcome the spring force of the button 20 and of the sealing elements 18 and 19 so that each of the tabs 48 can be moved away from the hooks 53 in the slots 50. The end cap 12 can then be rotated with respect to the body 11 to move the tabs 48 through the slots 50 until the tabs reach the slot openings 51. The end cap 12 is then removed from the body 11 by moving it axially with respect to the body.

To attach the end cap 12 to the body 11, the body is positioned relative to the end cap 12 so that tabs 48 are aligned with each the slot openings 51. In the illustrated embodiment, the relatively large number of tabs 48, i.e., 16 tabs, allows the tabs to be easily aligned with the four slot openings 51. The end cap 12 is pushed axially onto the body 11 so that the tabs are inserted into the slot openings 51. The end cap 12 is then rotated relative to the body so that the tabs 48 move circumferentially within the slots 50 until they encounter the locking groove 52. The hook 53 at the end of the slot has a beveled edge, and the tabs 48 are cammed over the hook as they reach the end of the slot and enter the locking groove 52. The spring force provided by the button 20 and the sealing members 18, 19, 22 and 23 of the filter elements 17 and 21 then forces the tabs into the locking groove 21 and keeps the tabs 48 from passing around the hook 53, thereby securing the end cap 12 to the body.

Various modifications can be made to the preferred design just described. For example, instead of providing the tabs on the end cap 12 and the slots 50 on the body 11, the tabs can be located on the body and the slots on the end cap. In addition a greater or lesser number of tabs and slots can be provided depending upon the size of the air cleaner.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. An air cleaner which comprises:
    a housing having an air inlet and an air outlet, the housing comprising
        a body having side portions and an open end, the side portions of the body including an outer edge portion adjacent to the open end, and
        an end cap adapted to close the open end of the body, the end cap having side portions which include a rim portion adapted to engage the outer edge portion of the body, at least one of the body and the end cap having a shroud connected therewith and inside the housing and spaced inwardly from the side portions and generally parallel thereto;
    a filter element captured between the body and the end cap within the housing and positioned between the air inlet and the air outlet, the filter element having a resilient portion, the resilient portion fitting entirely within the shroud and detached from the shroud, the resilient portion producing a spring force which urges the end cap away from the body; and
    a sealing bayonet connection formed in the body and the end cap for attaching the end cap to the body, the bayonet connection permitting the outer edge portion of the body to overlap the rim portion of the end cap providing a closed connection between the body and the end cap to sealingly close the housing at the bayonet connection and substantially prevent the flow of air therethrough, the bayonet connection being secured by resilient of the resilient portion.

2. An air cleaner as defined in claim 1, wherein the bayonet connection includes a plurality of tabs located on one of the body or the end cap and a plurality of slots formed on the other of the body or the end cap, each of the slots extending circumferentially and adapted to receive one of the tabs to removably connect the end cap to the body.

3. An air cleaner as defined in claim 2, wherein each of the slots includes a locking position in which the tab is secured in the slot.

4. An air cleaner which comprises:
    a housing having an air inlet and an air outlet, the housing comprising
        a generally cylindrical body defining a central axis and having side portions and an open end, the side portions of the body including an outer edge portion adjacent to the open end, and
        an end cap adapted to close the open end of the body, the end cap having side portions which include a rim portion adapted to engage the outer edge portion of the body, at least one of the body and the end cap having a generally cylindrical shroud connected therewith and inside the housing and spaced inwardly from the side portions and generally parallel thereto;
    a filter element positioned axially within the housing between the air inlet and the air outlet, the filter element including a resilient portion providing a spring force to urge the end cap axially away from the body, the resilient portion fitting entirely within the shroud and detached therefrom; and
    a sealing bayonet connection formed in the body and the end cap for attaching the end cap to the body, the bayonet connection permitting the outer edge portion of the body to overlap the rim portion of the end cap providing a closed connection between the body and the end cap to sealingly close the housing at the bayonet connection and substantially prevent the flow of air therethrough, the bayonet connection including a plurality of tabs located on one of the body or the end cap and a plurality of slots formed on the other of the body or the end cap, each of the slots extending circumferentially and adapted to receive one of the tabs to removably connect the end cap to the body, at least one of the slots having a locking position where one of the tabs is held in the slot as the spring force urges the end cap away from the body.

5. An air cleaner which comprises:

a housing having an air inlet and an air outlet, the housing comprising
   a generally cylindrical body defining a central axis and having side portions and an open end, and
   an end cap adapted to be attached to the body to close the open end of the body, the end cap having side portions, the housing including a shroud within the housing and spaced inwardly from the side portions and generally parallel thereto, the housing also including a positioning guide having a first end and a second end, the first end integrally formed with the housing, the second end extending outwardly within the housing and providing a curved tapered end;

a primary filter element adapted to be positioned within the housing between the air inlet and the air outlet; and a secondary filter element located with the primary filter element, the secondary filter element engaging the shroud and the positioning guide to support the secondary filter element and to maintain the filter element in a substantially axial position, the curved tapered end facilitating the placement of the filter element onto the positioning guide.

6. An air cleaner as defined in claim 5, wherein the air outlet extends axially from the housing and wherein the first end of the positioning guide is formed in the air outlet.

7. An air cleaner as defined in claim 6, wherein the positioning guide comprises a plurality of radially extending fins.

8. An air cleaner which comprises:

a housing having an air inlet and an air outlet, the housing comprising
   a generally cylindrical body defining a central axis and having side portions and an open end, and
   an end cap adapted to be attached to the body to close the open end of the body, the end cap having side portions;

the housing include a shroud within the housing and spaced inwardly from the side portions and generally parallel thereto, the air outlet extending axially from the housing, a positioning guide being formed in the air outlet, the positioning guide including a plurality of radially extending fins each having a first end and a second end, the first end of the fins being integrally formed with the housing and extending generally parallel to the side portions of the housing, the second end of the fins projecting outwardly within the housing and providing a curved tapered surface;

a primary filter element adapted to be positioned within the housing between the air inlet and the air outlets; and a secondary filter element located with the primary filter element, the curved surface of the fins facilitating placement of the secondary filter element around the fins, the secondary filter element engaging the shroud and the positioning guide to support the secondary filter element and to maintain the secondary filter element in a substantially axial position.

9. An air cleaner as defined in claim 8, wherein the fins form a cross.

10. An air cleaner as defined as claim 1, wherein the outermost one of the outer edge portion of the body and the rim portion of the end cap is tapered inwardly to provide a generally flush inner surface adjacent to the bayonet connection.

11. An air cleaner as defined in claim 1, wherein the bayonet connection includes an outer rim supported by a plurality of gussets which extend from the rim to the side portions of one of the body or the end cap.

12. An air cleaner as defined in claim 2, wherein each of the tabs is hollow with a central support therein.

* * * * *

UNITED STATES PATENT AND TRADEMARK OFFICE
CERTIFICATE OF CORRECTION

PATENT NO : 5,755,842
DATED : May 26, 1998
INVENTOR(S) : Patel et al.

It is certified that error appears in the above-identified patent and that said Letters Patent is hereby corrected as shown below:

Column 6, line 30, "resilient" (first instance) should be --the force--.
Column 8, line 21, "outlets" should be --outlet--.

Signed and Sealed this

Eighteenth Day of August, 1998

Attest:

BRUCE LEHMAN

Attesting Officer    Commissioner of Patents and Trademarks